United States Patent [19]
Riddiford

[11] Patent Number: 5,742,475
[45] Date of Patent: Apr. 21, 1998

[54] COMPUTING EQUIPMENT CASING HAVING HINGED, SPRING LOADED AND SLIDING LEAVES

[75] Inventor: Martin Philip Riddiford, London, United Kingdom

[73] Assignee: Psion Computer Plc, London, United Kingdom

[21] Appl. No.: 723,882

[22] Filed: Sep. 23, 1996

[30] Foreign Application Priority Data

Sep. 26, 1995 [GB] United Kingdom .................... 9519556

[51] Int. Cl.⁶ .................... G06F 1/16; H05K 5/02; E05F 1/08; E05D 7/00
[52] U.S. Cl. .................... 361/681; 16/365; 16/366; 16/291; 16/293; 16/308; 403/53; 403/63; 361/680
[58] Field of Search .................... 16/362, 365, 366, 16/291, 293, 294, 308; 403/80, 53, 63; 248/286.1, 923; 364/708.1; 312/327, 223.2; 361/680, 681, 683

[56] References Cited

U.S. PATENT DOCUMENTS

| | | | |
|---|---|---|---|
| 4,960,256 | 10/1990 | Chihara et al. | 248/286.1 |
| 5,168,426 | 12/1992 | Hoving et al. | 361/681 |
| 5,383,138 | 1/1995 | Motoyama et al. | 364/708.1 |

FOREIGN PATENT DOCUMENTS

| | | |
|---|---|---|
| 0 674 331 A1 | 9/1995 | European Pat. Off. . |
| 39 26 189 A1 | 2/1990 | Germany . |
| WO 91/17493 | 11/1991 | WIPO . |

OTHER PUBLICATIONS

"Membranes Help Open and Close Computer Case," *Design Engineering* (1992) Aug., London, GB. European Search Report, Jan. 21, 1997.

*Primary Examiner*—Michael W. Phillips
*Attorney, Agent, or Firm*—Sughrue, Mion, Zinn, Macpeak & Seas, PLLC

[57] ABSTRACT

A casing for computer equipment, the casing comprising first and second leaves for mounting the computer equipment, the leaves being hinged together so as to be movable between a folded position in which the first leaf overlies the second, and an open position; and a base to which the leaves are movably secured so as to allow the second leaf to slide relative to the base. In the open position of the leaves part of the base extends under the first leaf so as to provide a support to resist tipping movement when pressure is applied to the first leaf.

21 Claims, 5 Drawing Sheets

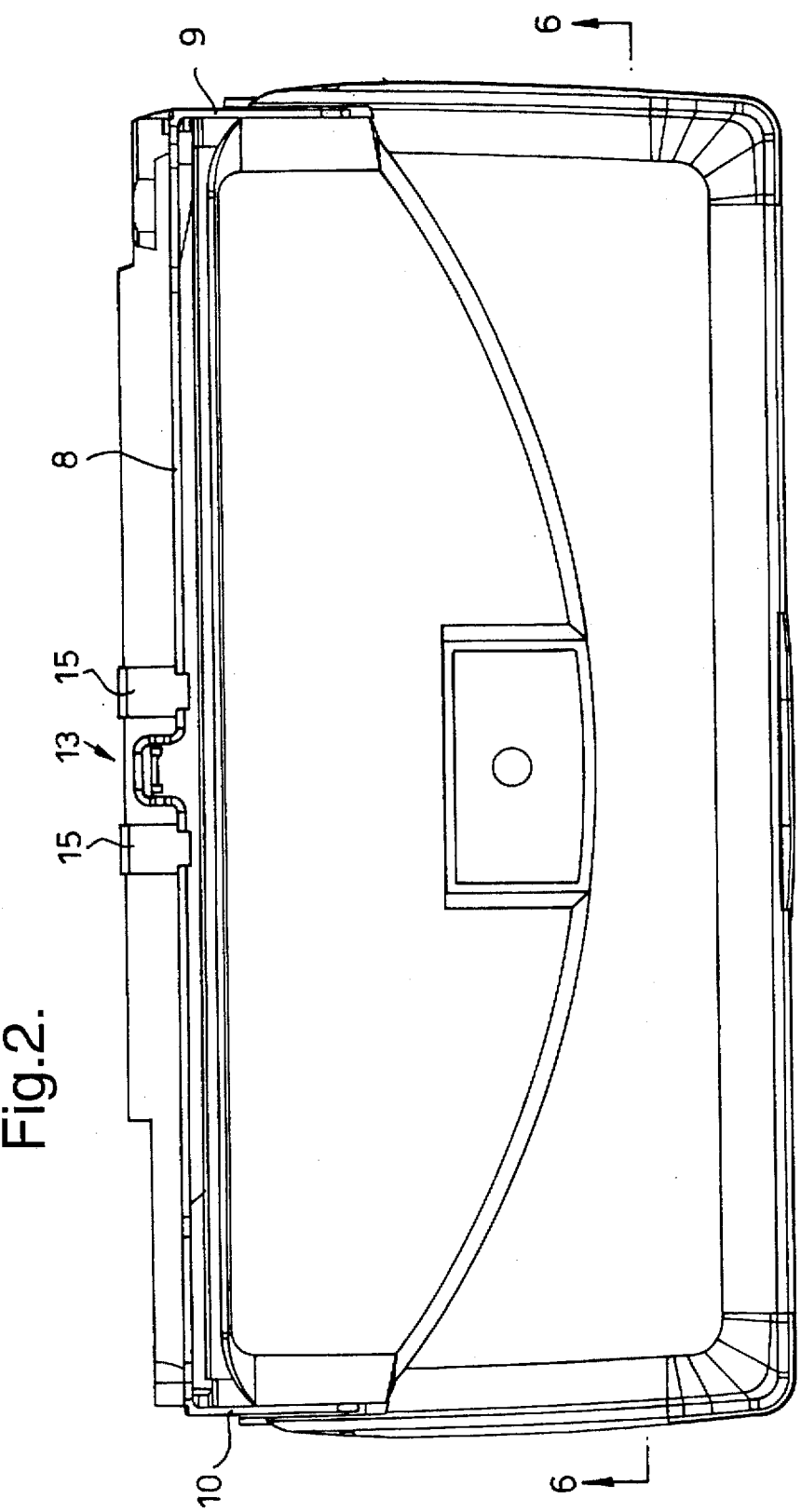

5,742,475

COMPUTING EQUIPMENT CASING HAVING HINGED, SPRING LOADED AND SLIDING LEAVES

FIELD OF THE INVENTION

The invention relates to a casing for computing equipment, for example palmtop and notebook style computers.

DESCRIPTION OF THE PRIOR ART

Conventional palmtop and notebook computers, such as the Psion Series 3a, have a two leaf casing, a key pad being mounted in one leaf and a display in the other. In an open position, the leaf holding the key pad rests on a surface and the leaf holding the display is in an upright orientation. It would be useful if a touch screen facility could be provided on the display. However, the problem with incorporating such a touch screen is that when the user wishes to touch the screen, he will need to support the casing to prevent it from tipping over, which is clearly undesirable.

One solution would be to allow the leaves to hinge into a fully horizontal orientation but this then makes it difficult to gain access to the screen without interfering with the key pad.

SUMMARY OF THE INVENTION

In accordance with the present invention, a casing for computing equipment comprises first and second leaves for mounting the computer equipment, the leaves being hinged together so as to be movable between a folded position in which the first leaf overlies the second, and an open position; and a base to which the leaves are movably secured so as to allow the second leaf to slide relative to the base whereby in the open position of the leaves part of the base extends under the first leaf so as to provide a support to resist tipping movement when pressure is applied to the first leaf.

We have devised a self-contained casing which automatically provides a support to resist tipping movement of the casing when pressure is applied to the first leaf (which would typically include a display). This allows the first leaf to be positioned at an obtuse angle relative to the second leaf when in the open position so as to be conveniently oriented for use.

The second leaf could be mounted via slide members directly to the base but preferably the leaves are secured to the base by a hinge mechanism extending between the first leaf and the base whereby pivotal movement of the first leaf relative to the second leaf causes sliding movement of the second leaf relative to the base. This is particularly convenient since a single pivoting movement of the first leaf relative to the second leaf will also cause the sliding movement.

The hinge mechanism could be provided in a variety of ways but typically will comprise a pair of laterally spaced arms each coupled at one end to the first leaf and pivoted to the base at the other end.

In some cases, the casing may be provided with a locking mechanism for locking the leaves in the closed and open positions respectively. Conveniently, however, the casing further comprises an urging mechanism for urging the leaves towards at least one, and preferably both, of the folded and open positions. The urging mechanism could be in the form of an over center mechanism such as a torsion spring.

Conveniently, the urging mechanism forms part of the hinge mechanism although it is not essential and the two could be provided as separate components.

The invention is particularly suited for use with a palmtop or notebook computer and in that case, preferably the base has similar dimensions in plan to the second leaf so that in the closed position the second leaf substantially covers the base. This provides a very neat and compact construction enabling the casing to be carried in a pocket or the like.

As mentioned above, in use, the first leaf of the casing preferably includes a display while an input device such as a key pad is mounted in the second leaf. Where the display includes a touch sensitive screen, the base provides support to enable pressure to be applied to the screen without tipping the casing over.

BRIEF DESCRIPTION OF THE DRAWINGS

An example of a portable, palmtop computer mounted in a casing according to the invention will now be described with reference to the accompanying drawings, in which:

FIG. 2 is a plan showing the computer in its closed position but with a rear cover removed;

DETAILED DESCRIPTION OF THE EMBODIMENT

Figure 1:
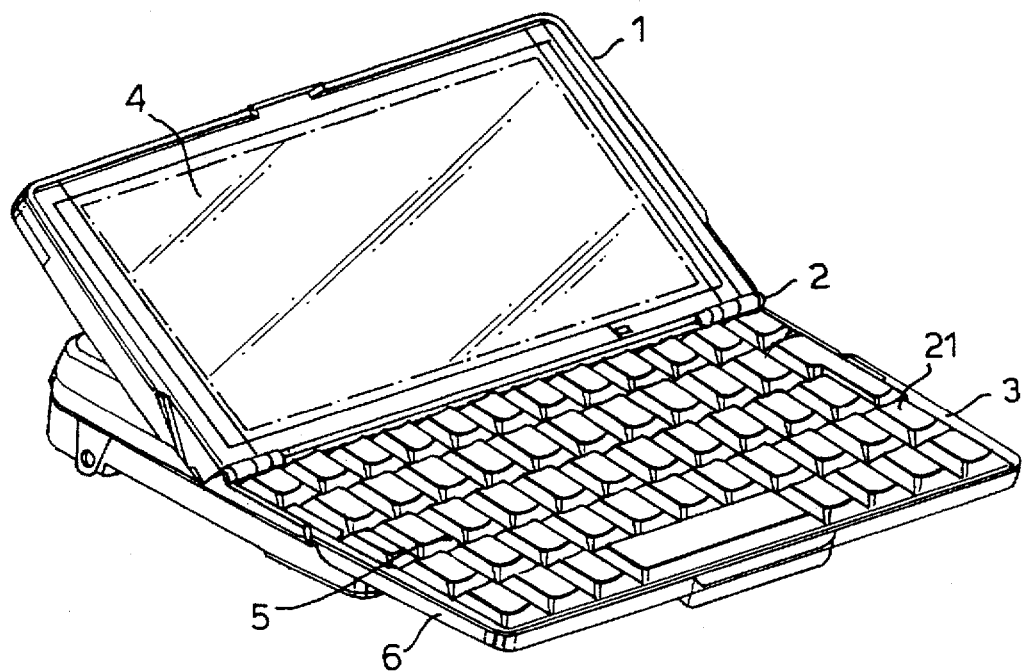
FIG. 1 is a perspective view from above showing the computer in its open position.

The computer shown in the drawings comprises a casing having a first, upper leaf 1 which is hinged at 2 to a second, lower leaf 3. The upper leaf 1 supports a touch screen 4 while the lower leaf supports a keyboard 5. In addition, a microprocessor (not shown) is mounted within the lower leaf 3 and is attached to the keyboard 5 and the touch screen 4. The lower leaf 3 is slidably mounted on a base 6. The rear section of the base 6 incorporates a battery housing 7 (FIGS. 3-5) for supplying power to the microprocessor.

In its closed position (FIGS. 2 and 3) the upper leaf 1 is folded over the base 6 and it will be seen that the lower leaf 3 has retracted into the base 6 so as to be substantially invisible in the closed position.

The upper leaf 1 is connected to the base 6 via a torsion spring 8 having a pair of laterally spaced arms 9,10 at its ends, each of which terminates in a laterally outwardly extending hook 11. Each hook 11 is received in a respective aperture 12 in the side of the upper leaf 1. A central section 13 of the torsion spring 8 is formed into a U-shape and is clamped onto a mounting 14, fixed to the base 6, by clamp members 15. The torsion spring 8 is formed to as to define an over center mechanism urging the leaf 1 either into the closed position shown in FIG. 3 or the fully open position shown in FIG. 5.

The leaf 3 carrying the keyboard 5 is slidably mounted to the base 6 due to engagement between a chassis member 16 forming part of the base 6 and a base member 17 of the keyboard 5. The interlocking engagement between the chassis member 16 and the base member 17 can be seen more clearly in FIG. 7. The chassis member 16 is secured to a support plate 18 while the base member 17 of the keyboard 5 rests slidably on the chassis member 16.

Figure 6:
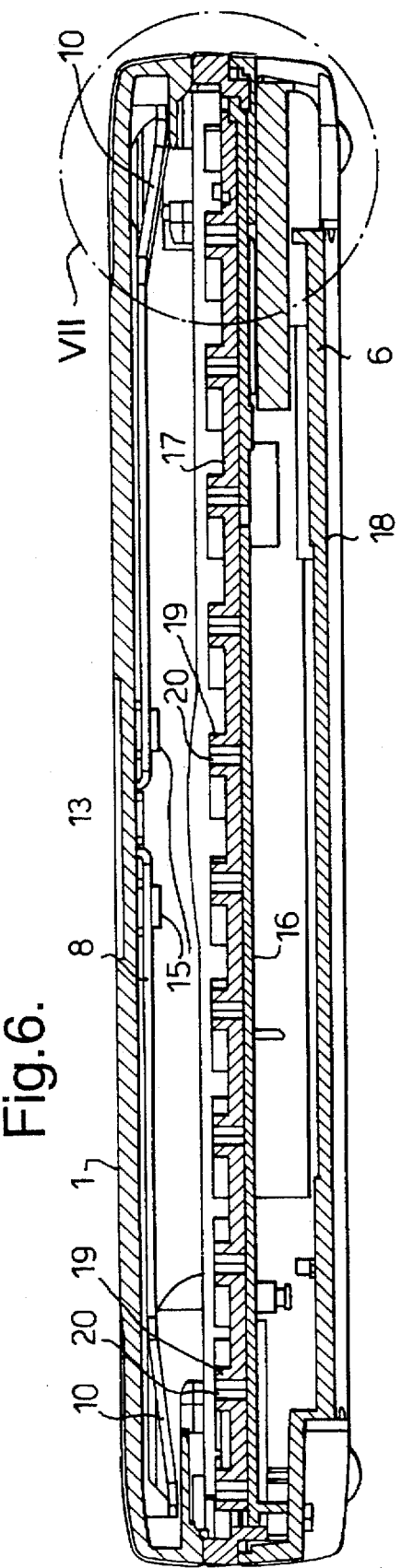
FIG. 6 is a cross-section taken on the line 6—6 in FIG. 2.
Figure 7:
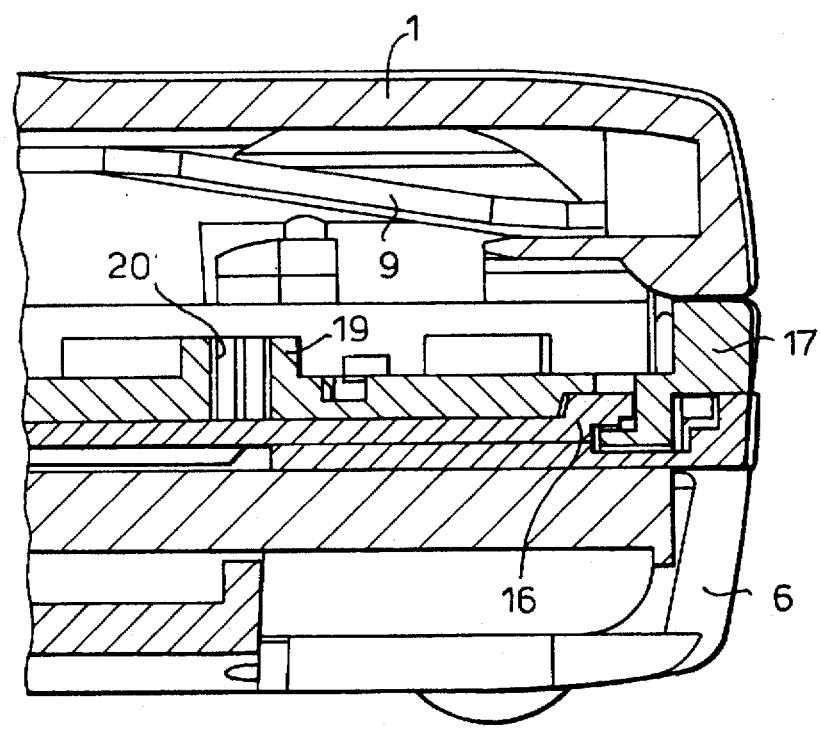
FIG. 7 is an enlarged view of detail A in FIG. 6.

The base member 17 has a number of upstanding bosses 19 defining respective bores 20 some of which are indicated in FIG. 6 and FIG. 7. Each boss 19 supports a respective key 21 of the keyboard 15 which has, on its underside, a depending spigot (not shown) which is received within the cruciform shaped bore 20. The construction of the keyboard can have a variety of forms but in the preferred arrangement is in accordance with the key assembly described and claimed in our co-pending patent application Ser. No. 08/723,881, filed Sep. 23, 1996, and entitled "Key Assembly" and claiming priority from British Patent Application No. 9519557.4.

Figure 3:
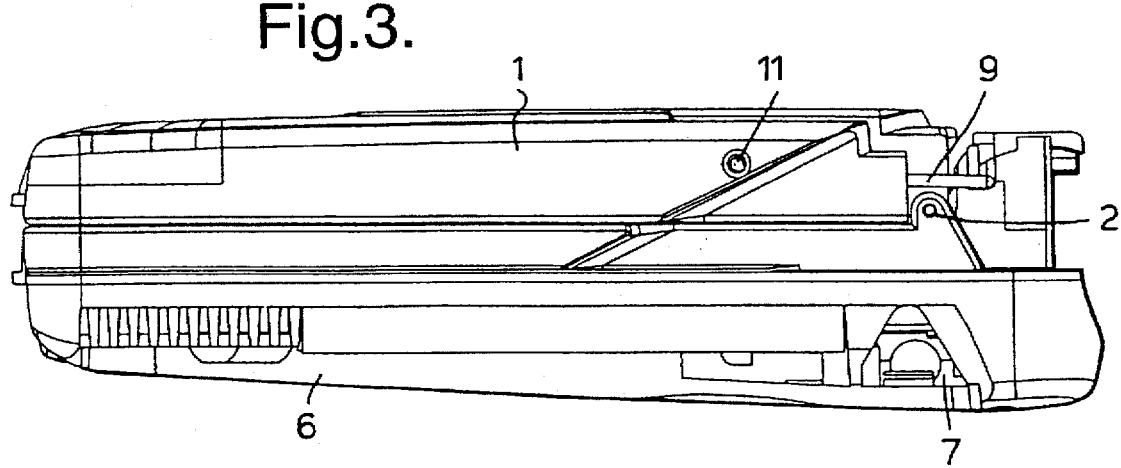
FIGS. 3-5 are side elevations showing the computer in closed, partially open and fully open positions respectively.
Figure 4:
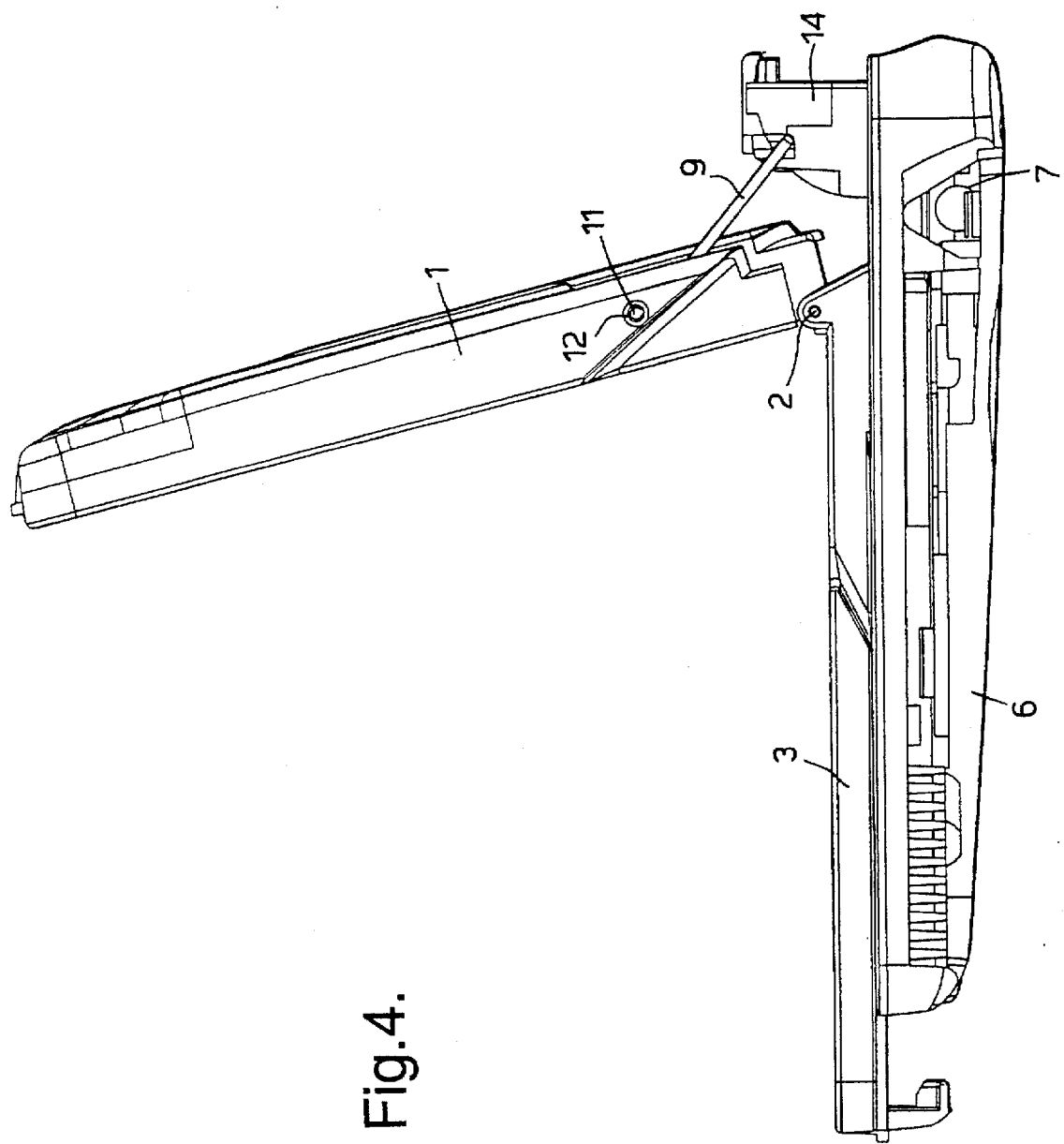
Figure 5:
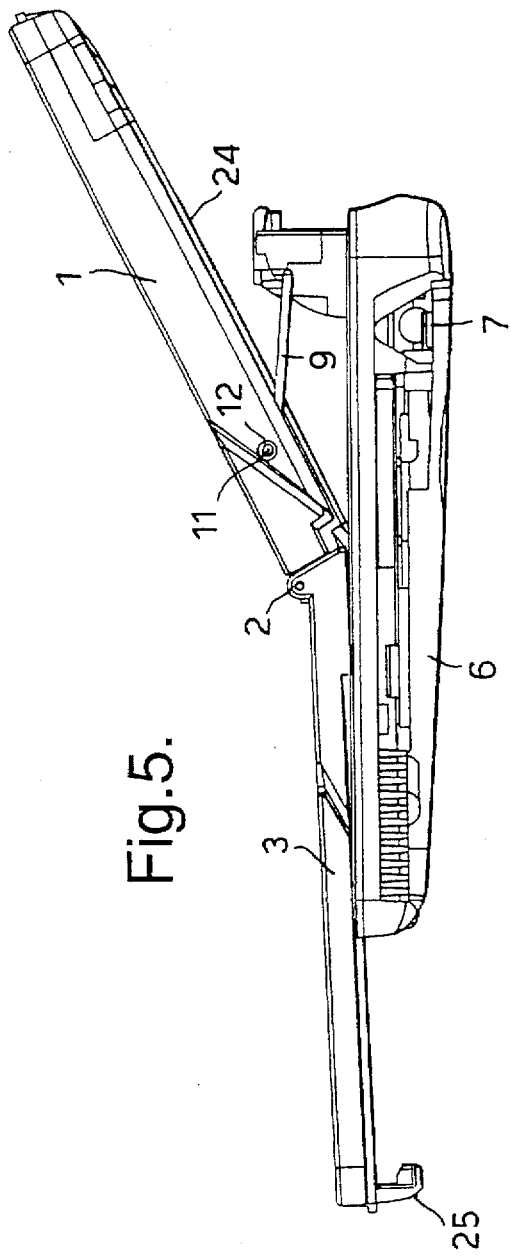

The operation of the casing can be seen most easily by comparing FIGS. 3, 4 and 5. Thus, initially the casing is in its closed position as shown in FIG. 3 in which the leaf 1 rests on the base 6 with the leaf 3 retracted. The user then grasps the free end of the leaf 1 and raises it as shown in FIG. 4. This movement is against the resilience of the torsion spring 8 which tends to urge the leaf 1 towards its closed position at this stage. As the leaf 1 is raised, it will pivot about the hooks 11 so that the leaf 3 is slid forwardly along the base 6. At the same time, the torsion spring 8 rotates about its longitudinal axis. Further opening movement of the leaf 1 pushes the leaf 3 further forward until a rear surface 24 of the leaf 1 engages parts of the torsion spring arms 9,10 and further movement is prevented. The position of the leaves 1,3 is then as shown in FIGS. 1 and 5.

In the fully open position, the user can press, either with his finger or a suitable tool, the touch screen 4 and the reaction force to this pressure will be provided by the part of the base 6 lying behind the leaf 1 since the downward force is transmitted through the arms 9,10 of the torsion spring 8 to the rest of the torsion spring and hence to the base 6. Furthermore, the center of gravity of the leaf 1 overlies the base 6 thus also reducing the risk of tipping movement. Similarly, pressure applied to keys on the keyboard 5 will also not cause significant pivoting movement of the computer.

Consistent with the intended applicability of the present invention to notebook and palmtop computers, preferably the casing is configured to that its overall dimensions in the folded position do not exceed 170 mm×90 mm×23 mm.

For additional security, an L-shaped lug 25 is provided on a front end of the leaf 3 which can act as a stabilising foot in the open position as shown in FIG. 5 and which, in the closed position, locks into an aperture (not shown) provided in the front edge of the base 6 to prevent inadvertent opening of the leaf 1.

I claim:

1. A casing for computing equipment, the casing comprising first and second leaves for mounting the computer equipment, said leaves being hinged together so as to be movable between a folded position in which said first leaf overlies said second leaf, and an open position, said casing further comprising an urging mechanism for urging said leaves toward at least one of said folded and open positions; and a base to which said leaves are movably secured so as to allow said second leaf to slide relative to said base whereby in the open position of said leaves part of said base extends under said first leaf so as to provide a support to resist tipping movement when pressure is applied to said first leaf.

2. A casing according to claim 1, wherein said leaves are secured to said base by a hinge mechanism extending between said first leaf and said base whereby pivotal movement of said first leaf relative to said second leaf causes sliding movement of said second leaf relative to said base.

3. A casing according to claim 2, wherein said hinge mechanism comprises a pair of laterally spaced arms each coupled at one end to said first leaf and pivoted to said base at the other end.

4. A casing according to claim 1, wherein said urging mechanism comprises an over center mechanism.

5. A casing according to claim 4, wherein said urging mechanism comprises a torsion spring.

6. A casing according to claim 1, wherein said leaves are secured to said base by a hinge mechanism extending between said first leaf and said base whereby pivotal movement of said first leaf relative to said second leaf causes sliding movement of said second leaf relative to said base, and wherein said urging mechanism forms part of the hinge mechanism.

7. A casing according to claim 6, wherein said hinge mechanism comprises a pair of laterally spaced arms each coupled at one end to said first leaf and pivoted to said base at the other end, wherein said urging mechanism comprises a torsion spring and wherein the pair of arms are coupled to the torsion spring.

8. A casing according to claim 7, wherein said pair of arms and said torsion spring are formed from a single wire.

9. A casing according to claim 1, wherein the overall dimensions of the casing in the folded position do not exceed 170 mm×90 mm×23 mm.

10. A casing according to claim 1, wherein said base has similar dimensions in plan to said second leaf so that in the closed position said second leaf substantially covers said base.

11. Computing equipment mounted in a casing, the casing comprising first and second leaves for mounting the computer equipment, said leaves being hinged together so as to be movable between a folded position in which said first leaf overlies said second leaf, and an open position, said casing further comprising an urging mechanism for urging said leaves toward at least one of said folded and open positions; and a base to which said leaves are movably secured so as to allow said second leaf to slide relative to said base, whereby, in the open position of said leaves, part of said base extends under said first leaf so as to provide a support to resist tipping movement when pressure is applied to said first leaf, the computing equipment including a display mounted in said first leaf and an input device mounted in said second leaf.

12. Computing equipment according to claim 11, wherein the display includes a touch sensitive screen.

13. Computing equipment according to claim 11, wherein the input device comprises a key pad.

14. Computing equipment according to claim 11, wherein said casing is dimensioned such that said computing equipment is portable.

15. Computing equipment according to claim 14, wherein said computing equipment comprises a notebook computer.

16. Computing equipment according to claim 14, wherein said computing equipment comprises a palmtop computer.

17. Computing equipment according to claim 11, wherein said urging mechanism comprises an over center mechanism.

18. Computing equipment according to claim 17, wherein said urging mechanism comprises a torsion spring.

19. Computing equipment according to claim 11, wherein said leaves are secured to said base by a hinge mechanism extending between said first leaf and said base whereby pivotal movement of said first leaf relative to said second leaf causes sliding movement of said second leaf relative to said base, and wherein said urging mechanism forms part of the hinge mechanism.

20. Computing equipment according to claim 19, wherein said hinge mechanism comprises a pair of laterally spaced arms each coupled at one end to said first leaf and pivoted to said base at the other end, wherein said urging mechanism comprises a torsion spring and wherein the pair of arms are coupled to the torsion spring.

21. Computing equipment according to claim 20, wherein said pair of arms and said torsion spring are formed from a single wire.

* * * * *